(12) United States Patent
Dai et al.

(10) Patent No.: US 6,431,037 B1
(45) Date of Patent: Aug. 13, 2002

(54) METHOD FOR ENGAGEMENT CUTTING AN IMAGING ELEMENT

(75) Inventors: Chi-An Dai, Rochester, NY (US);
Andy H. Tsou, Houston, TX (US);
Stephen C. Meissner, West Henrietta, NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/151,978

(22) Filed: Sep. 11, 1998

(51) Int. Cl.[7] ................................................. B26D 1/14
(52) U.S. Cl. ............................ 83/13; 83/500; 83/636; 83/675; 83/676; 83/694; 83/948
(58) Field of Search .......................... 83/678, 663, 673, 83/675, 694, 695, 948, 698.51, 698.61, 699.31, 699.41, 676, 500–503, 875, 686, 636, 13; 72/326, 327; 225/103; 30/357

(56) References Cited

U.S. PATENT DOCUMENTS

| | | | | |
|---|---|---|---|---|
| 2,369,896 A | * | 2/1945 | Harris et al. | 29/90.01 |
| 2,377,130 A | * | 5/1945 | Cohen | 83/665 |
| 3,459,086 A | * | 8/1969 | Reeder, Jr. | |
| 3,465,631 A | * | 9/1969 | Reeder, Jr. | |
| 3,570,363 A | * | 3/1971 | Thomas | 83/37 |
| 3,724,305 A | * | 4/1973 | Kondo | 83/14 |
| 3,788,118 A | * | 1/1974 | Joseph | 83/695 X |
| 4,414,874 A | * | 11/1983 | Barnes et al. | |
| 4,854,204 A | * | 8/1989 | Faltin | 83/676 X |
| 4,861,674 A | | 8/1989 | Inaba et al. | |
| 5,327,806 A | * | 7/1994 | Houser | 83/636 |
| 5,385,704 A | | 1/1995 | Tsou et al. | |
| 5,423,239 A | * | 6/1995 | Sakai et al. | |
| 5,772,495 A | * | 6/1998 | Sanda et al. | 83/948 X |
| 5,813,304 A | * | 9/1998 | Matthias et al. | 83/948 X |

FOREIGN PATENT DOCUMENTS

DE 3829239 2/1997

* cited by examiner

Primary Examiner—Kenneth E. Peterson
(74) Attorney, Agent, or Firm—Doreen M. Wells

(57) ABSTRACT

The present invention is a method of cutting an imaging element. An imaging element is moved through a cutting zone formed by a first cutting blade having a first cutting surface and a first engaging surface and a second cutting blade having a second cutting surface and a second engaging surface. In the cutting zone the first engaging surface and the second engaging surface are in contact for a distance greater than or equal to a thickness of the imaging element. The first cutting surface and said second cutting surface are separated by from 1 to 30 percent of the thickness of the imaging element in the cutting zone. The present invention reduces debris and skiving generation.

4 Claims, 4 Drawing Sheets

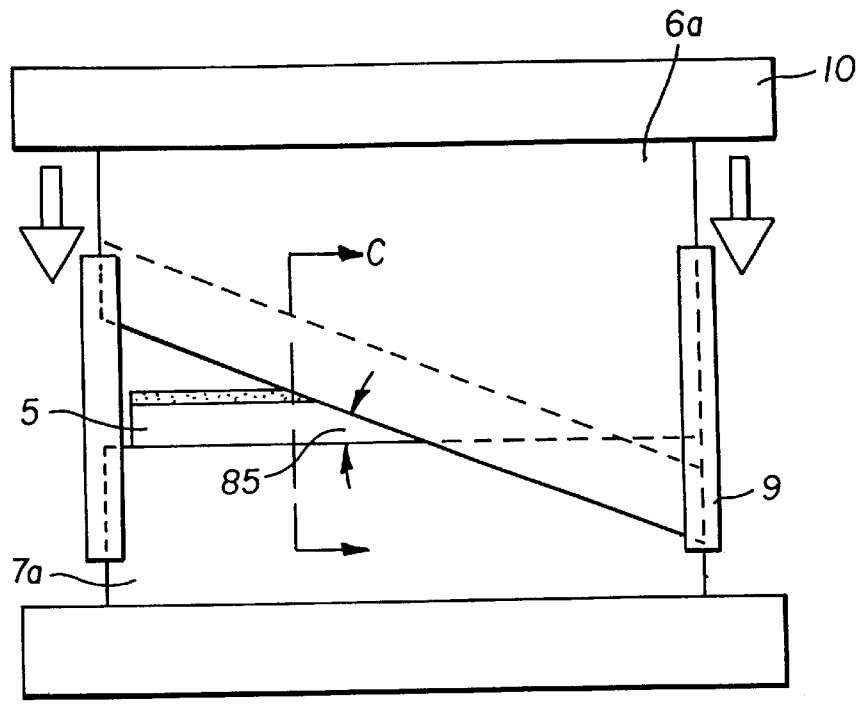
FIG. 9
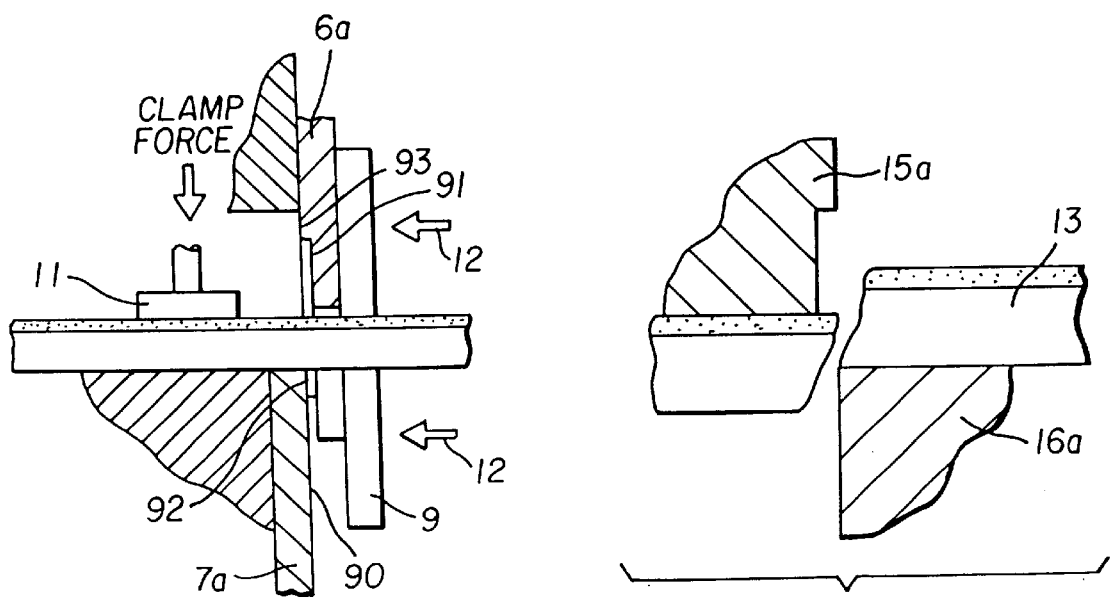
FIG. 10
FIG. 11

METHOD FOR ENGAGEMENT CUTTING AN IMAGING ELEMENT

FIELD OF THE INVENTION

This invention relates to cutting webs or strips of an imaging element, and more particularly to improvements in cutting a continuously running web of an imaging element into sections of predetermined length and width without debris generation.

BACKGROUND OF THE INVENTION

Converting of a web having an image forming layer, typically a silver halide emulsion, into predetermined sizes is a key step in the manufacture of imaging products. Depending on the format of an imaging product, the converting processes generally involve slitting, chopping, and/or perforating. Because of the demands for cleanliness in imaging products, it is critical to minimize dirt generation during the converting processes.

A conventional slitting method employs a plurality of rotating circular blades at predetermined intervals. The rotary blades are arranged side by side in upper and lower pairs so that each pair of upper and lower opposing rotary blades radially overlap each other. The blades rotate in opposite directions but remain engaged with each other, thereby cutting the imaging product into strips. The slitting method is described with reference to FIGS. 1 to 3. FIG. 1 is a front view of a plurality of rotating circular blades mounted on a pair of rollers with a spring load 4 to maintain blade engagement. FIG. 2 is a side view of a pair of rotating blades. FIG. 3 is a sectional view taken along a line C—C in FIG. 2.

As shown in FIG. 2, upper and lower blades 1 and 2, which are rotating blades of a slitter 3, rotate in the forward direction, as indicated by the arrows, of the running direction of an imaging product web 5. The blades are opposed to each other from the top and bottom surfaces of the imaging product web so as to overlap each other in their radial directions. The upper and lower blades 1 and 2 overlap each other so as to press against each other. Slitting of the web occurs by passing the web between the upper and lower blade 1,2. The pressure between the upper and lower blades is controlled by a predetermined spring load 4.

A guillotine chopper is an apparatus for transversely chopping a continuously moving web of imaging product. The guillotine chopper includes a fixed solid base for supporting the moving web to be cut. A mobile part is mounted in translation with respect to the base. A knife-blade (upper blade) is supported by the mobile part. The mobile part moves in a plane perpendicular to the base and cooperates with a counterblade (lower blade) to cut or slit the imaging product. The knife-blade and counterblade press against each other under a constant pressure controlled by a spring force. The guillotine chopper is with reference to FIGS. 4 to 5. FIG. 4 is a front view of a guillotine chopper. FIG. 5 is the sectional side view taken along a line C—C in FIG. 4.

As shown in FIG. 4, upper and lower blades 6 and 7 are arranged in the transverse direction of an imaging product web 5. The upper blade 6 moves into the lower blade 7 with a constant shear angle 8 guided and supported by slide 9 on the mobile part 10. A web clamp 11 is positioned prior to the cut point to provide rigid support of the moving web during chopping. The upper and lower blades 6 and 7 are pressed against each other under a constant pressure provided by a spring load 12.

In both rotating blade slitting and guillotine slitting, the upper and lower blades are engaged under a constant force for mechanical stability. Because of this blade contact, zero clearance is achieved for ease of cutting with minimal edge deformation. This blade-blade contact also helps to continuously renew and sharpen the blade tips and surfaces. As shown in FIG. 6, because of the plastic deformation of a ductile imaging element 13, such as a polyester support, the fracture surface protrudes out into the knife path. A piece of support material 14 can then be removed by the upper blade 15 generating skiving debris.

German OLS DE 3829239 published Mar. 9, 1989 suggests modifying the morphology of a polyethylene terephthalate support to achieve clean cutting of a magnetic recording film. U.S. Pat. No. 5,385,704 describes methods to reduce planar orientation of polyethylene terephthalate photographic film base to provide films that are easily cut while generating low quantities of dirt in the process. Although these structural optimizations of a polyethylene terephthalate support for clean cutting are attractive approaches, they do not provide the manufacturing flexibility to cutting systems. It is desirable to provide cutting systems that deliver clean cut edges regardless of the support material employed for an imaging element.

U.S. Pat. No. 5,423,239 discusses slitting a continuous running magnetic tape with a gap between blade edges to prevent burring. With the overall thickness of a magnetic tape ranging from 0.6 to 1.4 mil, this gap was suggested within 0.02 to 0.3 mil. To apply this gap, either the upper and lower blades of a slitter are disengaged and separated with a gap, or maintain engagement but one of the cutting edges is chamfered. For a much thicker imaging film, such as the photographic film, it is mechanically unstable to disengage the upper and lower blades of a slitter due to the higher bending stiffness of the film. While using a chamfered inclined side surface as one of the cutting edges can provide the clearance between blades, this clearance is not a constant but changes with blade penetration into the material. In addition, an inclined surface leads to a point contact between upper and lower blades, thus, accelerating the tip wear. The cutting methods taught by this reference are either impractical for thick imaging elements, deficient in maintaining constant clearance, or prone to higher tip wear. The present invention provides cutting systems that deliver clean cutting without debris generation while avoiding the problems and limitations of the prior art.

It is therefore an object of the present invention to provide a method for slitting and chopping an imaging element whereby it is possible to prevent dirt and skiving generation along the edge of an imaging element while maintaining the engagement between upper and lower blades for mechanical stability but without accelerating the blade wear.

SUMMARY OF THE INVENTION

The present invention is a method of cutting an imaging element. An imaging element is moved through a cutting zone formed by a first cutting blade having a first cutting surface and a first engaging surface and a second cutting blade having a second cutting surface and a second engaging surface. In the cutting zone the first engaging surface and the second engaging surface are in contact for a distance greater than or equal to a thickness of the imaging element. The first cutting surface and said second cutting surface are separated by from 1 to 30 percent of the thickness of the imaging element in the cutting zone. The present invention reduces debris and skiving generation.

BRIEF DESCRIPTION OF THE DRAWINGS

FIG. 9 is a schematic side view illustrating a guillotine chopper constructed in accordance with the preferred embodiment of the invention.

FIG. 10 is a sectional view taken along a line of C—C in FIG. 9.

FIG. 11 is a sectional view of a pair of engaging blades with the preferred embodiment of the invention illustrating the prevention of edge skiving.

For a better understanding of the present invention together with other objects, advantages and capabilities thereof, reference is made to the following description and claims in connection with the above described drawings.

DESCRIPTION OF THE INVENTION

The foregoing objective of the present invention can be attained by a method characterized in that a continuously running imaging element web having a support, such as polyester, cellulose ester, or resin-coated paper, is slit and chopped by a pair of engaged blades, having a constant clearance between them in a range of 1% to 30% of the thickness of the imaging element.

The imaging elements of this invention can be of many different types depending on the particular use for which they are intended. Such elements include, for example, photographic, electrophotographic, electrostatographic. photothermographic, migration, electrothermographic, dielectric recording and thermal-dye-transfer imaging elements. Photographic elements can comprise various polymeric films, papers and the like, but both cellulose acetate and polyester supports well known in the art are preferred. Support thickness of 2 to 10 mil (0.002 to 0.010 inches) is commonly used.

A preferred embodiment of a slitter and a guillotine chopper to which the method for slitting and chopping an imaging element according to the present invention is applied will be described with reference to the accompanying drawings.

Figure 1:
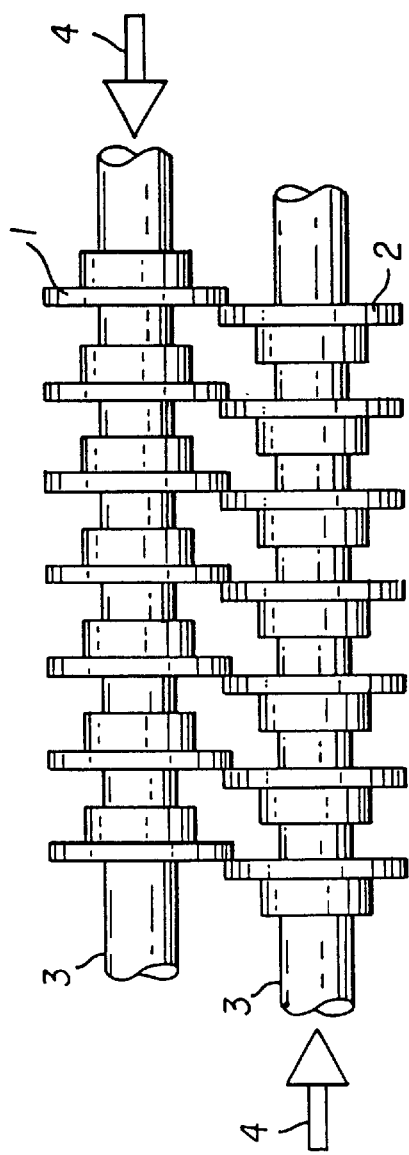
FIG. 1 is a schematic front view illustrating a conventional slitter with a plurality of rotating circular blades mounted on a pair of rollers.
Figure 3:
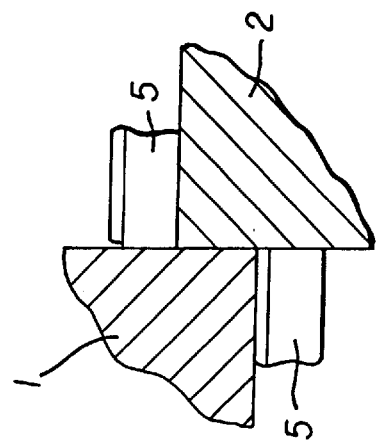
FIG. 3 is a sectional view taken along a line C—C in FIG. 2.
Figure 2:
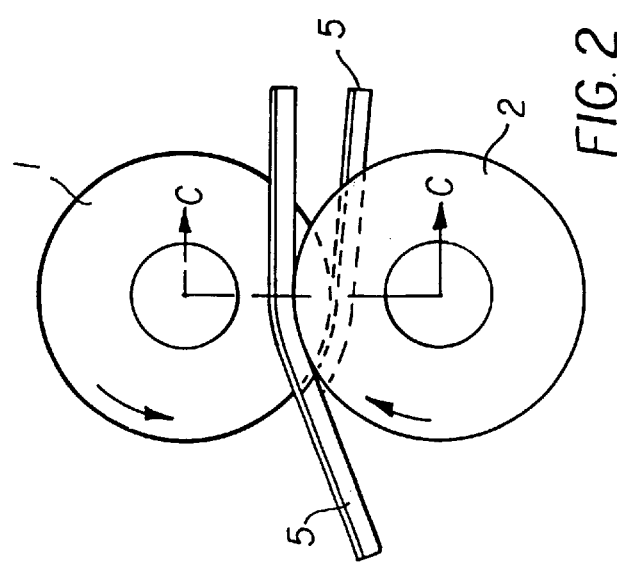
FIG. 2 is a side view of a pair of conventional rotating blades.
Figure 4:
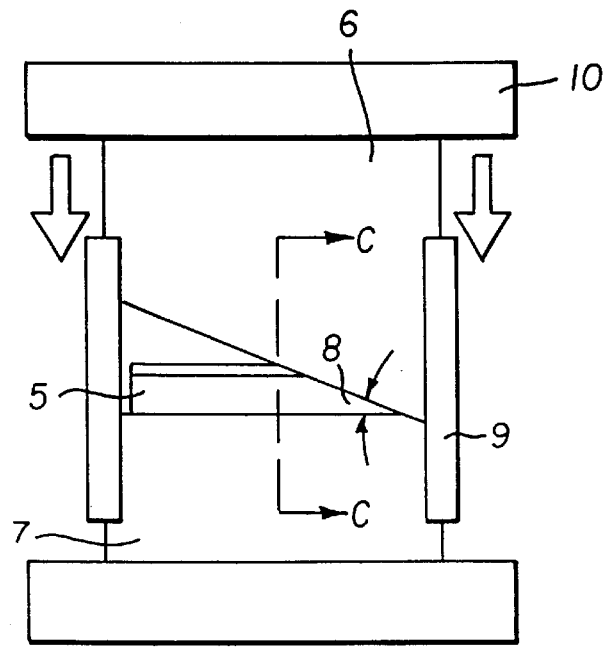
FIG. 4 is a schematic front view illustrating a conventional guillotine chopper.
Figure 5:
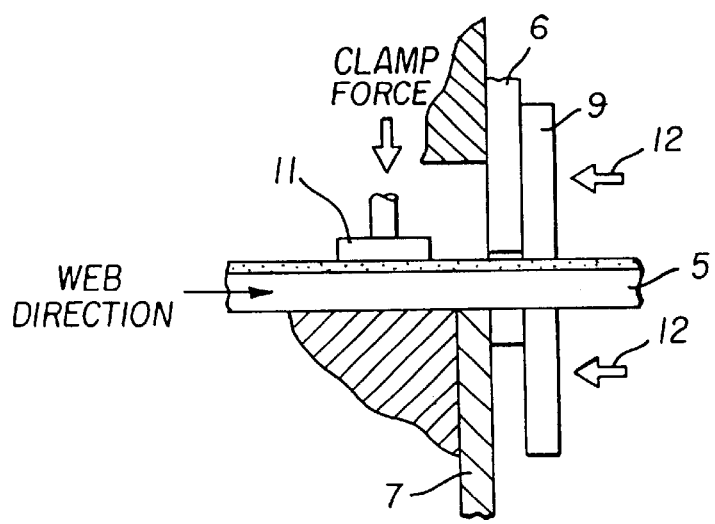
FIG. 5 is a sectional view taken along a line of C—C in FIG. 4.
Figure 6:
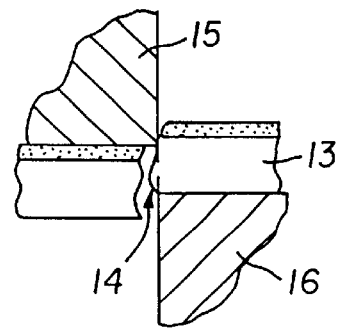
FIG. 6 is a sectional view of a pair of engaging blades illustrating the skiving generation during cutting.
Figure 7:
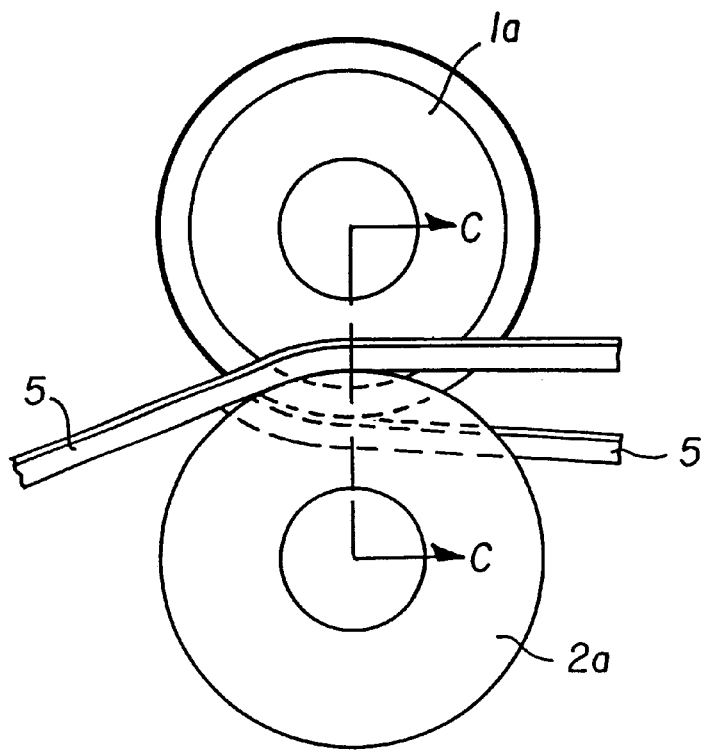
FIG. 7 is a schematic side view illustrating a slitter constructed in accordance with the preferred embodiment of the invention.
Figure 8:
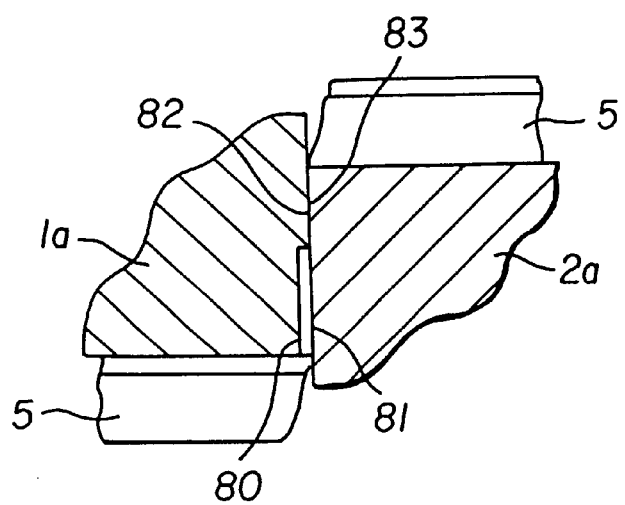
FIG. 8 is a sectional view taken along a line of C—C in FIG. 7.

FIG. 7 is a schematic side view illustrating a slitter of this embodiment. FIG. 8 is a sectional side view taken along the line C—C in FIG. 7.

FIG. 9 is a schematic side view illustrating a guillotine chopper of the present invention. FIG. 10 is a sectional side view taken along the line C—C in FIG. 9. FIG. 11 is a sectional view of a pair of engaging blades illustrating the prevention of skiving.

The upper and lower blades 1a and 2a in the slitter shown in FIGS. 7 and 8 are arranged so that in the cutting zone their cutting edges 80 and 81 are separated by a predetermined clearance while their engaging surfaces 82 and 83 remain engaging under a constant spring force and overlap each other by an amount equal or greater than the thickness of the imaging element. Based on our study, reduced skiving generation can be realized immediately with a clearance between blades. However, substrate deformation becomes more pronounced with increasing clearance. There is an upper limit of the clearance beyond which the cut quality degrades and dirt generation increases with blade shearing off the surfaces of the imaging element. This upper limit for the clearance is about 31% of the thickness of the imaging element. Lower blade 2a contains cutting edge 81 and engaging surface 83 which are coplanar, while upper blade 1a has cutting edge 80 and engaging surface 82 with engaging surface 82 overhanging cutting edge 80 providing the clearance between cutting edges 80, 81.

Likewise, the upper and lower blades 6a and 7a in the guillotine chopper in FIGS. 9 and 10 are arranged so that in the cutting zone their cutting edges 90 and 91 are separated by a predetermined clearance while their engaging surfaces 92 and 93 remain engaging under a constant spring force and overlap each other by an amount equal or greater than the thickness of the imaging element. In FIG. 10 the engaging surfaces are not in contact as the imaging element is not in the cutting zone.

The clearance is obtained by selectively depressing one or both of the upper and lower blades along the cutting area by a predetermined amount. Methods include EDM (electric discharge machining), chemical etch, grinding, milling, and lapping to prepare the blade edge cutting surface with a predetermined depression in the cutting zone.

As has been described, according to the present invention, a continuous running imaging element web having at least one image forming layer of a support is slit and chopped from the top and bottom surfaces of the imaging element by a pair of engaged upper and lower blades overlapping each other with a clearance between the cutting blades set to be a value within the above-specified range. Accordingly, there is no case where the imaging element edge at the cut section comes in contact with the blade side surface. It is therefore able to prevent the generation of skivings, which was unavoidable previously.

In FIG. 11 imaging element 13 is cut by cutting blades 15a, 16a whose cutting surfaces are separated by a predetermined clearance in the cutting zone.

Moreover, with the present invention, adjustment of the apparatus can be carried out extremely easily and engagement of the blades is maintained with a constant force for excellent machine stability. In addition, according to the present invention, the upper and lower cutting blade tips are prevented from rubbing against each other, so that the tip wear is reduced and the service life of blades is prolonged.

In a particularly preferred embodiment, the imaging elements of this invention are photographic elements, such as photographic films, photographic papers or photographic glass plates, in which the image-forming layer is a radiation-sensitive silver halide emulsion layer. Such emulsion layers typically comprise a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly (vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material.

In addition to emulsion layers, the elements of the present invention can contain auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. The support can be any suitable support used with photographic elements. Typical supports include polymeric films, paper (including polymer-coated paper), glass and the like. Details regarding supports and other layers of the photographic elements of this invention are contained in Research Disclosure, Item 36544, September, 1994.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in Research Disclosure, Item 36544, September, 1994, and the references listed therein.

The photographic silver halide emulsions utilized in this invention can contain other addenda conventional in the photographic art. Useful addenda are described, for example, in Research Disclosure, Item 36544, September, 1994. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

The following examples are used to illustrate the present invention. However, it should be understood that the invention is not limited to these illustrative examples.

The examples demonstrate the benefits of guillotine chopping of a polyester support and a polyester-based photographic film within the above-specified clearance range.

EXAMPLES

A guillotine chopper was provided with a basic configuration as shown in FIGS. 9 and 10. The shear angle 85 is 10 degrees, and the material of the blades was CPM (crucible particle metal) stainless steel. The clearance between blades was obtained by EDM of the surface of the upper blade by a predetermined amount as described in the examples. Upper and lower engaging surfaces 92 and 93 remained in contact in the cutting zone with a spring load of 12 lb.

A 4.7-mil thick polyethylene terephthalate film was made in accordance with U.S. Pat. No. 5,385,604. Cutting was performed on the polyethylene terephthalate film support while changing the clearance between the cutting surfaces 90 and 91 and the cutting speed. The clearance is expressed both in mil and in percent relative to the support thickness. Using an optical microscope at 200×, fracture surfaces of the polyethylene terephthalate film support after chopping were examined.

The results of chopping are shown in Tables 1–4. In the table, the mark ○ indicated a superior cut edge quality with no debris and skiving, the mark Δ indicates a cut edge that has few debris and skivings, and the mark × indicates an unacceptable cut edge that is filled with debris and skivings. Comparative examples A–E represent the conventional method, that is there is no clearance between the cutting surfaces 90 and 91.

TABLE 1

(Cutting Speed = 20 in/sec)

| | Clearance (mil) | Clearance (%) | Variation |
|---|---|---|---|
| Comparative Example A | 0 | 0 | Δ |
| Example 1 | 0.5 | 11 | ○ |
| Example 2 | 1.45 | 31 | Δ |

TABLE 2

(Cutting Speed = 50 in/sec)

|  | Clearance (mil) | Clearance (%) | Variation |
|---|---|---|---|
| Comparative Example B | 0 | 0 | X |
| Example 3 | 0.5 | 11 | ○ |
| Example 4 | 1.45 | 31 | X |

TABLE 3

(Cutting Speed = 80 in/sec)

|  | Clearance (mil) | Clearance (%) | Variation |
|---|---|---|---|
| Comparative Example C | 0 | 0 | X |
| Example 5 | 0.5 | 11 | ○ |
| Example 6 | 1.45 | 31 | X |

TABLE 4

(Cutting Speed = 120 in/sec)

|  | Clearance (mil) | Clearance (%) | Variation |
|---|---|---|---|
| Comparative Example D | 0 | 0 | X |
| Example 7 | 0.5 | 11 | ○ |
| Example 8 | 1.45 | 31 | X |

To the above-mentioned polyethylene terephthalate film, a U-coat to facilitate adhesion of the photographic emulsion layers was applied. The U-coat is a terpolymer of acrylonitrile, vinylidenen chloride and acrylic acid made in accordance with U.S. Pat. No. 3,919,156. This film was coated on the backside with a carbon black dispersion in a cellulose acetate naphthalate binder and on the front side with a multilayer color photographic emulsion described in U.S. Pat. No. 5,385,704. The final thickness of the coated photographic film is 5.3 mil.

Using the above-described conditions, chopping was performed while changing the clearance at a fixed chopping speed of 80 in/sec. The results of chopping are shown in Table 5.

TABLE 5

(Cutting Speed = 80 in/sec)

|  | Clearance (mil) | Clearance (%) | Variation |
|---|---|---|---|
| Comparative Example F | 0 | 0 | X |
| Example 9 | 0.5 | 11 | ○ |

As is apparent from the results shown in the above Tables, using a clearance at a value within the range of 1% to 30% of the thickness of the polyethylene terephthalate support, superior cutting could be performed for both the support and the photographic film coated on the polyethylene terephthalate support.

The invention has been described in detail with particular reference to certain preferred embodiments thereof, but it will be understood that variations and modifications can be effected within the spirit and scope of the invention.

What is claimed is:

1. A method of cutting an imaging element comprising:

providing a first cutting blade having a first cutting surface and a first engaging surface;

providing a second cutting blade having a second cutting surface and a second engaging surface, said second cutting surface being offset from said second engaging surface but generally parallel thereto and providing a constant clearance between said first and second cutting surfaces;

bringing said first and second cutting blades toward one another forming a cutting zone wherein said first and second engaging surfaces are in contact for a distance at least equal to a thickness of the imaging element; and moving said imaging element through the cutting zone while maintaining separation between said first and second cutting surfaces of from 1 to 30 percent of the thickness of the imaging element.

2. The method of claim 1 wherein said first engaging surface and said first cutting surface are coplanar.

3. The method of claim 1 wherein said first cutting blade and said second cutting blade each have a rotational axis substantially parallel to each other and to a surface of said imaging element.

4. The method of claim 1 wherein said imaging element further comprises a support comprising polymeric films or resin coated paper.

* * * * *